United States Patent
Arambepola et al.

(10) Patent No.: US 10,652,055 B2
(45) Date of Patent: May 12, 2020

(54) INTERFERENCE MITIGATION

(71) Applicant: Intel Corporation, Santa Clara, CA (US)

(72) Inventors: Bernard Arambepola, Enfield (GB); Thushara Hewavithana, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 16/312,686

(22) PCT Filed: Jun. 14, 2017

(86) PCT No.: PCT/EP2017/064539
§ 371 (c)(1),
(2) Date: Dec. 21, 2018

(87) PCT Pub. No.: WO2018/015076
PCT Pub. Date: Jan. 25, 2018

(65) Prior Publication Data
US 2019/0334746 A1    Oct. 31, 2019

(30) Foreign Application Priority Data
Jul. 22, 2016  (EP) ..................... 16180755

(51) Int. Cl.
H04L 25/08    (2006.01)
H04B 1/10     (2006.01)
H04L 5/00     (2006.01)
H04L 7/00     (2006.01)
H04L 5/14     (2006.01)
(Continued)

(52) U.S. Cl.
CPC ........... *H04L 25/08* (2013.01); *H04B 1/1027* (2013.01); *H04L 5/0005* (2013.01); *H04L 7/0008* (2013.01); *H04L 5/14* (2013.01); *H04L 25/0224* (2013.01); *H04L 2025/03414* (2013.01)

(58) Field of Classification Search
CPC ..... H04L 25/08; H04L 7/0008; H04L 5/0005; H04L 2025/03414; H04L 25/0224; H04L 5/14; H04L 25/03159; H04L 25/022; H04B 1/1027
USPC ....................................................... 375/260
See application file for complete search history.

(56) References Cited

U.S. PATENT DOCUMENTS 6,791,995 B1    9/2004  Azenkot et al.
9,999,059 B2*   6/2018  Cheng .................. H04W 56/00
(Continued)

OTHER PUBLICATIONS

International Search Report and Written Opinion dated Dec. 11, 2017 for PCT Application PCT/EP2017/064539.

*Primary Examiner* — Juan A Torres
(74) *Attorney, Agent, or Firm* — Eschweiler & Potashnik, LLC

(57) ABSTRACT

Symbols are received on a downstream channel. A value of a channel synchronization parameter is determined based on the received symbols. An interference event on the downstream channel is detected. In response to detecting the interference event: an output signal is determined based on at least one cached value of the channel synchronization parameter, the at least one cached value being determined based on symbols received prior to and offset from the detecting of the interference event.

12 Claims, 7 Drawing Sheets

(51) Int. Cl.
    *H04L 25/02*        (2006.01)
    *H04L 25/03*        (2006.01)

(56) References Cited

U.S. PATENT DOCUMENTS 10,103,776 B2 * 10/2018 Wu .................... H04L 12/2898
2004/0228390 A1   11/2004 Sommer et al.

* cited by examiner

INTERFERENCE MITIGATION

This application is a National Phase entry application of International Patent Application No. PCT/EP2017/064539 filed on Jun. 14, 2017, which claims priority to European Patent Application 16180755.7 filed on Jul. 22, 2016, entitled "INTERFERENCE MITIGATION" in the name of Bernard Arambepola et al. and is hereby incorporated by reference in its entirety.

FIELD

A device comprises a receiver configured to receive symbols on a downstream channel. The device comprises at least one circuitry configured to determine a value of a channel synchronization parameter based on the received symbols. The at least one circuitry is further configured to detect an interference event on the downstream channel. The at least one circuitry is further configured to output an output signal determined based on at least one cached value of the channel synchronization parameter in response to detecting the interference event.

BACKGROUND

Transmission on channels is exposed to various sources of disturbance. Interference can result. Detection and mitigation of interference is therefore an integral task of modern transmission techniques.

E.g., cable modems in a Hybrid Fiber Coax network operate under the Data Over Cable Service Interface Specification (DOCSIS) protocol. Here, downstream (DS) data is transmitted on a broadcast channel. The DS channel is time-frequency-sliced into a corresponding resource mapping. The resource mapping defines resource elements. Each resource element may have a certain bandwidth and duration. Resource elements correspond to one or more symbols. E.g., the frequency bandwidth of resource elements may correspond to an Orthogonal Frequency Division Multiplex (OFDM) subcarrier.

According to DOCSIS, upstream (US) data is transmitted within well-defined resource elements of the resource mapping. For this, channel synchronization between transmitter and receiver is required. The channel synchronization parameters—such as time-domain offsets and frequency-domain offsets between the transmitter and the receiver—is typically derived from received DS symbols. Time-domain offsets may accumulate to a timing drift.

It has been observed that in various deployment scenarios interference events can degrade the quality of DS data transmission. In particular, such interference events can prevent the accurate determining of the channel synchronization parameters. This, in turn, often prevents US data transmission. Furthermore, after recovery from an interference event, according to reference implementations the time to acquire channel synchronization is significant—such that duration during which US transmission is not possible is additionally prolonged. Further, DS transmission may be interrupted for a significant duration.

An example deployment scenario which is particularly prone to interference events corresponds to the so-called full duplex transmission. Here, a first customer premises equipment (CPE) may communicate on the US channel in a given resource element; while a second CPE may communicate on the DS channel in the given resource element. The communication lines associated with the first and second CPEs may share the same cable bundle. Here, significant crosstalk between the lines associated with the first and second CPEs can cause the interference event. DS communication will suffer from an interference event due to the US communication.

SUMMARY

Accordingly, a need exists for transmission techniques with improved capability of interference mitigation. In particular, need exists for transmission techniques which overcome or mitigate at least some of the above-identified drawbacks.

This need is met by the features of the independent claims. The dependent claims define embodiments.

According to an example, a device comprises a receiver. The receiver is configured to receive symbols on a DS channel. The device further comprises at least one circuitry. The at least one circuitry is configured to determine a value of a channel synchronization parameter based on the received symbols. The at least one circuitry is further configured to detect an interference event on the DS channel. The at least one circuitry is further configured to output an output signal determined based on at least one cached value of the channel synchronization parameter. Said outputting of the output signal is in response to detecting the interference event. The at least one cached value is determined based on symbols received prior to and offset from said detecting of the interference event.

According to an example, a method comprises receiving symbols on a DS channel. The method further comprises determining a value of a channel synchronization parameter based on the received symbols. The method further comprises detecting an interference event on the DS channel. The method further comprises, in response to detecting the interference event: outputting an output signal. The output signal is determined based on at least one cached value of the channel synchronization parameter. The at least one cached value is determined based on symbols received prior to and offset from said detecting of the interference event.

According to an example, a computer program product comprises program code to be executed by at least one processor. Executing the program code causes the processor to perform a method. The method comprises receiving symbols on a DS channel. The method further comprises determining a value of a channel synchronization parameter based on the received symbols. The method further comprises detecting an interference event on the DS channel. The method further comprises, in response to detecting the interference event: outputting an output signal. The output signal is determined based on at least one cached value of the channel synchronization parameter. The at least one cached value is determined based on symbols received prior to and offset from said detecting of the interference event.

According to an example, a computer program comprises program code to be executed by at least one processor. Executing the program code causes the processor to perform a method. The method comprises receiving symbols on a DS channel. The method further comprises determining a value of a channel synchronization parameter based on the received symbols. The method further comprises detecting an interference event on the DS channel. The method further comprises, in response to detecting the interference event: outputting an output signal. The output signal is determined based on at least one cached value of the channel synchronization parameter. The at least one cached value is determined based on symbols received prior to and offset from said detecting of the interference event.

According to an example, a device comprises a receiver. The receiver is configured to receive symbols on a DS channel. The device further comprises at least one circuitry configured to detect an interference event on the DS channel. The at least one circuitry is configured to determine a first phase gradient based on a symbol received at a first point in time prior to the start point of the interference event. The at least one circuitry is further configured to determine a second phase gradient based on a symbol received at a second point in time subsequent to an endpoint of the interference event. The at least one circuitry is further configured to determine a timing drift of the receiver between the first point in time and the second point in time based on the first phase gradient and the second phase gradient.

According to an example, a method comprises receiving symbols on a DS channel. The method further comprises detecting an interference event on the DS channel. The method further comprises determining a first phase gradient based on a symbol received at a first point in time prior to the starting point of the interference event. The method further comprises determining a second phase gradient based on a symbol received at a second point in time subsequent to an endpoint of the interference event. The method further comprises determining a timing drift of the receiver between the first point in time and the second point in time based on the first phase gradient and the second phase gradient.

According to an example, a computer program product comprises program code to be executed by at least one processor. Executing the program code causes the processor to perform a method. The method comprises receiving symbols on a DS channel. The method further comprises detecting an interference event on the DS channel. The method further comprises determining a first phase gradient based on a symbol received at a first point in time prior to the starting point of the interference event. The method further comprises determining a second phase gradient based on a symbol received at a second point in time subsequent to an endpoint of the interference event. The method further comprises determining a timing drift of the receiver between the first point in time and the second point in time based on the first phase gradient and the second phase gradient.

According to an example, a computer program comprises program code to be executed by at least one processor. Executing the program code causes the processor to perform a method. The method comprises receiving symbols on a DS channel. The method further comprises detecting an interference event on the DS channel. The method further comprises determining a first phase gradient based on a symbol received at a first point in time prior to the starting point of the interference event. The method further comprises determining a second phase gradient based on a symbol received at a second point in time subsequent to an endpoint of the interference event. The method further comprises determining a timing drift of the receiver between the first point in time and the second point in time based on the first phase gradient and the second phase gradient.

It is to be understood that the features mentioned above and those yet to be explained below may be used not only in the respective combinations indicated, but also in other combinations or in isolation without departing from the scope of the invention.

DETAILED DESCRIPTION OF EMBODIMENTS

Figure 1:
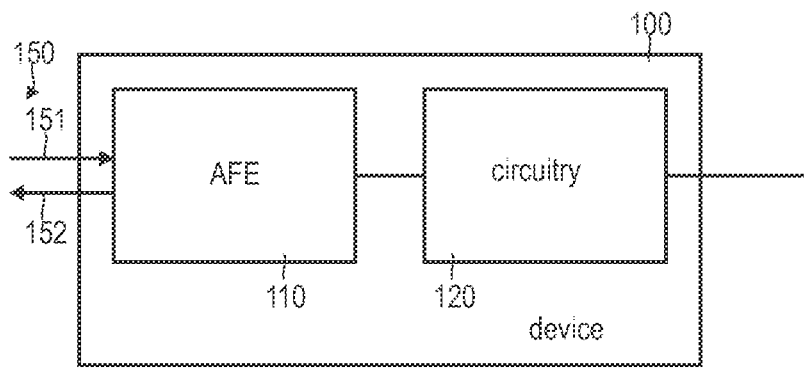
FIG. 1 schematically illustrates a device according to various embodiments, the device comprising a transceiver and circuitry.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Some examples described herein relate to detecting an interference event on a channel. Here, the channel may be implemented on any physical medium such as: wireline; wireless transmission line; copper wire; coaxial cable; etc.

Symbols can be communicated on the channel. Communication of symbols encoding data can be implemented according to OFDM modulation. Other modulation schemes are also conceivable.

Besides communication of data symbols, other symbols may provide for channel control. E.g., for the purposes of channel sounding, it is possible to employ downlink pilot signals and/or uplink pilot signals having well-defined transmit properties such as amplitude and phase.

In an example implementation, the techniques described herein are applied to Hybrid Fiber Coax networks operating under the DOCSIS protocol and supporting full duplex transmission.

In some examples, channel synchronization parameters are reliably approximated during the presence of an interference event. For this, it is possible to cache values of the respective channel synchronization parameters during normal operation and access at least one of the cached values in response to detecting the interference event. To ensure that the at least one cached value accessed in response to detecting the interference event is not already degraded due to the interference, a cached value may be selected which has been determined based on symbols received prior to and offset from said detecting of the interference event: A time-gap may exist between the cached value and said detecting of the interference event. This allows for compensating latency encountered when detecting the interference event. A safety margin in time domain can be implemented which ensures that the selected at least one cached value is not already negatively influenced by the interference event.

Then, it is possible to continuously attempt to receive and decode DS data based on the channel synchronization parameters. Thereby, recovery from the interference event can be reliably and quickly detected, e.g., based on an error on a measure of the decoder, etc. Furthermore, receiving of DS data encoded by the DS signals can quickly commence upon recovery from the interference event.

In further examples, it is possible to accurately determine the timing drift experienced by the receiver during the interference event. For this, it is possible to consider the phase gradients prior to and after the interference event. The phase gradient may be defined as the rate of change of the phase with respect to frequency. In some examples, the phase gradients prior to and after the interference event may be considered. By determining the difference of phase gradients prior to and after the interference event, it is possible to accurately derive the timing drift. Thereby, it is possible to quickly resume uplink transmission on the channel after recovery from the interference event by accounting for this timing drift in upstream timing calculations.

The techniques described herein may find particular application in connected home scenarios such as the Internet of Things. This is because the techniques allow for reliable communication.

FIG. 1 schematically illustrates a device 100. The device 100 comprises a transceiver 110, e.g., implemented by an analog front end. The device 100 further comprises circuitry 120. E.g., the circuitry 120 may be configured to perform digital signal processing.

The device 100 is configured to communicate on a channel 150. The channel comprises a DS channel 151 and an US channel 152. E.g., the transmission on the channel 150 may be according to the DOCSIS protocol.

Figure 2:
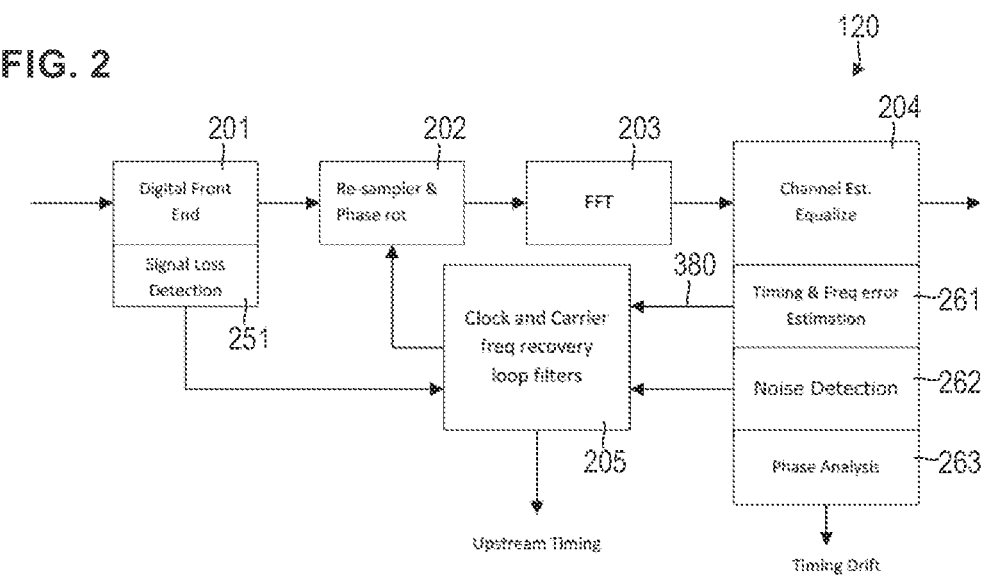
FIG. 2 schematically illustrates the circuitry of the device of FIG. 1 in greater detail.

FIG. 2 schematically illustrates various aspects with respect to the circuitry 120. The circuitry 120 implements OFDM demodulation and decoding of DS symbols. The circuitry 120 is sometimes referred to as digital demodulator. E.g., DS symbols received on the DS channel 151 can be communicated in a band having a bandwidth of up to 192 MHz and with Quadrature Amplitude Modulation (QAM)-4096. Higher QAM factors are conceivable, e.g. QAM-16384.

The digital front end (DFE) 201 comprises functions such as frequency translation, filtering, and digital adaptive gain control. Further, the DFE 201 implements a function 251 for detecting a sudden loss of signal energy. E.g., the function 251 may rely on two low-pass filters, one with a long time constant and the other one with a short time constant. Filters may take as their input the signal amplitude or square of signal amplitude; this enables the filters to work out short term and long term mean signal amplitudes or signal power. Then, based on a comparison of the outputs of the two filters, the loss of signal energy can be detected.

The circuitry 120 further comprises a circuit for resampling and phase rotation 202 and an FFT filter 203 for demodulation. The re-sampler and the phase rotator 202 corrects for clock and carrier frequency errors in reception. The timing reference or the clock in the receiver may not have the same frequency as that in the transmitter. Therefore, the received signal may be re-sampled such that the new sample points have the same spacing in time as the transmitter. The received signal may also have a non-zero frequency offset with reference to the transmitter. This frequency offset is corrected by phase rotation. The fast Fourier transform (FFT) filter 203 takes the signal into the frequency domain to enable the digital processing of individual subcarriers. The circuitry 120 further comprises an equalizer 204 which compensates for the frequency dependent amplitude and phase distortion introduced by the channel.

A Noise Detection module 262 is used for detecting noise level in individual OFDM symbols. E.g., the noise may be detected based on an error measure of the pilot subcarriers. OFDM transmissions usually comprises pilot subcarriers to aid receiver synchronization and channel equalization. The amplitude and the phase angles of pilot subcarriers are known to the receiver. Therefore, the receiver can determine the error in these pilot subcarriers. The average of the squared value of this error over the pilots of a specific symbol gives a measure of the noise level of that OFDM symbol. This may be used to detect an interference event. The noise detection function 262 is configured to detect a deterioration of the signal-to-noise ratio (SNR) exceeding a certain threshold. Because the noise detection function 262 is arranged comparably far downstream within the signal processing queue of the circuitry 120, also such a detection of an interference event is associated with an inherent latency.

The Timing and Frequency Error Estimation function 261 is used for determining timing and frequency offset errors. The function 261 is thus configured to determine the channel synchronization parameters based on the pilot subcarriers. In detail, the function 261 may estimate timing and frequency errors based on the phase angles of the pilot subcarriers. Such estimation may be independent of equalization. When the pilot subcarriers are noisy, the timing and frequency offset estimates also become less accurate. Generally, such a determination by the function 261 is only possible as long as an interference event is not present. The function 261 outputs a signal 380 to a filter 205.

Based on the determined channel synchronization parameters, i.e., based on the signal 380, coefficients for controlling the re-sampler and the phase rotation circuit 202 are determined by one or more loop filters 205. The coefficients are thus indicative of the channel synchronization parameters. E.g., an output register of the filter 205 may output an output signal indicative of the clock frequency with reference to a nominal rate. E.g., the register of the filter 205 may indicate the carrier frequency error (frequency offset) as a fraction of the subcarrier spacing.

If an interference event is detected, the function 261 typically cannot determine current channel synchronization parameters. However, even if an interference event is detected, the filter 205 outputs an output signal to the circuit 202. For this, the filter 205 may be operated in a different operational mode in response to detecting the interference event. For this, the filter receives control signals from the functions 251, 262, said control signals being indicative of the interference event. Based on the control signals, it is possible to switch between different operational modes of the filter.

By implementing the filter 205 such that it continues to output a signal to the circuit 202, the circuitry 120 may attempt decoding of the received symbols based on said output signal and in response to an interference event. E.g., recovery from the interference event can then be detected based on said attempted decoding. Recovery may be detected by the function 262 if the mean square error determined by the noise detection function 262 using pilot subcarriers is significantly reduced.

The techniques described herein are based on the finding that the implementation of the operational mode of the filter 205 upon detecting the interference event may significantly increase the quality of detecting the recovery from the interference event. E.g., the recovery may be detected quicker and/or more reliable. For this, hereinafter techniques are described which enable to output an output signal by the filter 205 which allows for accurate operation of the circuit 202 during the interference event.

Figure 3:
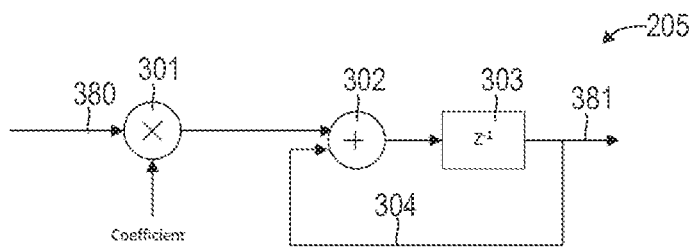
FIG. 3 schematically illustrates a loop filter of the circuitry of the device of FIG. 1 according to reference implementations.

FIG. 3 illustrates aspects with respect to the filter 205 greater detail. FIG. 3 illustrates a loop filter 302, 303, 304 implemented by the filter 205 according to reference implementations.

The input signal 380 provided to the loop filter 302, 303, 304 is preconditioned by using a multiplier 301. The loop filter 302, 303, 304 then filters the preconditioned input signal 380. The input signal 380 may be indicative of a timing and a frequency estimate. The loop filter 205 may receive an updated value of the input signal 380 once every OFDM symbol. Generally, the loop filter 205 may operate and generate outputs at the OFDM symbol rate.

If an interference event is not detected, the loop filter 302, 303, 304 continuously tracks the input clock frequency and the input carrier frequency and provides a corresponding output signal 381.

In the scenario of FIG. 3, if an interference event is detected, the input signal 380 deteriorates. This prevents the loop filter 302, 303, 304 from accurately tracking the input clock frequency and input carrier frequency.

If an interference event is detected, various elements of the circuitry 120 are informed. E.g., the adaptive gain adjustment of the DFE 201 freezes its gain to avoid false updates due to noisy data. Also, the channel frequency response used for equalization in 204 is frozen. OFDM symbol timing will also be held frozen.

Further, according to example implementation, the channel synchronization parameters including the time-domain offsets and frequency offsets output by the loop filter 302, 303, 304 are prevented from being updated and set to a fixed value. To achieve this, the filter 205 is enhanced with additional logic.

Figure 4:
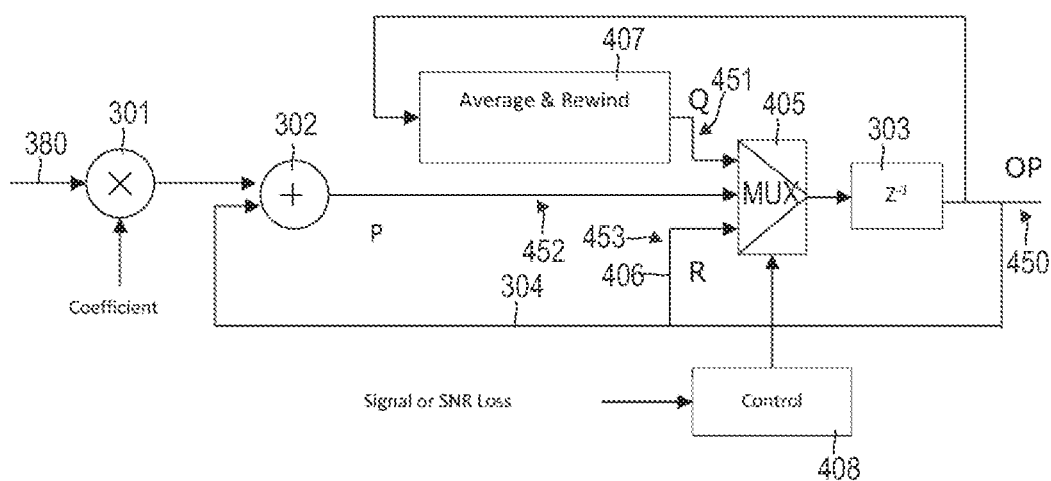
FIG. 4 schematically illustrates a loop filter of the circuitry of the device of FIG. 1 according to various embodiments.

FIG. 4 illustrates aspects of the filter 205. FIG. 4 illustrates aspects with respect to preventing operation of the loop filter 302, 303, 304 based on disturbed channel synchronization parameters, i.e., based on a disturbed input signal 380. In particular, FIG. 4 illustrates aspects with respect to outputting an output signal 450 based on at least one cached value of the channel synchronization parameters in response to detecting an interference event.

FIG. 4 generally corresponds to FIG. 3. In the scenario of FIG. 4, the loop filter 302, 303, 304 is supplemented with additional logic to provide interference mitigation.

If an interference event is not detected, the multiplexer switch 405 is operated by a control 408 such that the signal 452 is provided as an output signal 450. Then, operation of the FFT filter 203 in the implementation of FIG. 4 corresponds to the operation of the FFT filter 203 in the implementation of FIG. 3. I.e., the channel synchronization parameters indicated by the output signal 450 are continuously updated. This corresponds to a first operational mode of the filter 205.

As can be seen, the output of the loop filter 302, 303, 304 is also connected to the average and rewind circuit 407 implementing a further branch. The circuit 407—in the example of FIG. 4—operates even if an interference event is not detected. Hence, the circuit 407 continuously receives an input signal—corresponding to the output signal 450—and outputs its output signal 451. The output signal 451 is indicative of at least one cached value of the output signal 450—and, as such, indicative of at least one cached value of the channel synchronization parameter. The circuit 407 is configured such that the at least one cached value has been determined based on symbols received prior to and offset from said detecting of the interference event. If the interference event is not detected, the output signal 451 is discarded; this is done by appropriately operating the switch 405.

Then, in response to detecting an interference event, the operational mode of the filter 205 is changed. The control 408 is configured to operate the switch 405 in response to detecting the interference event: initially the output signal of the circuit 407 is provided as the output signal 450. E.g., it is possible that the output signal 450 corresponds to the output signal of the circuit 407 for a single OFDM symbol period. Then, the feedback signal 453 of the branch 406 is subsequently provided as the output signal 450 by the control 408 operating the switch 405 accordingly. E.g., the feedback signal 453 may be provided as long as the interference event is persistent. Thereby, while the interference event is persistent, the initially provided output signal 451 of the circuit 407 is preserved by means of the branch 453.

If recovery from the interference event is detected: Even after an endpoint of the interference event, it is possible that the multiplexer switch 405 provides the signal 453 as the output signal 450 for one or more OFDM symbol periods. This may be done to ensure that the loop filter 302, 303, 304 has settled to a stable signal 452 before the latter provided as the output signal 450. Then, eventually, the output signal 450 corresponds to the signal 452 provided by the feedback branch 304.

Figure 5:
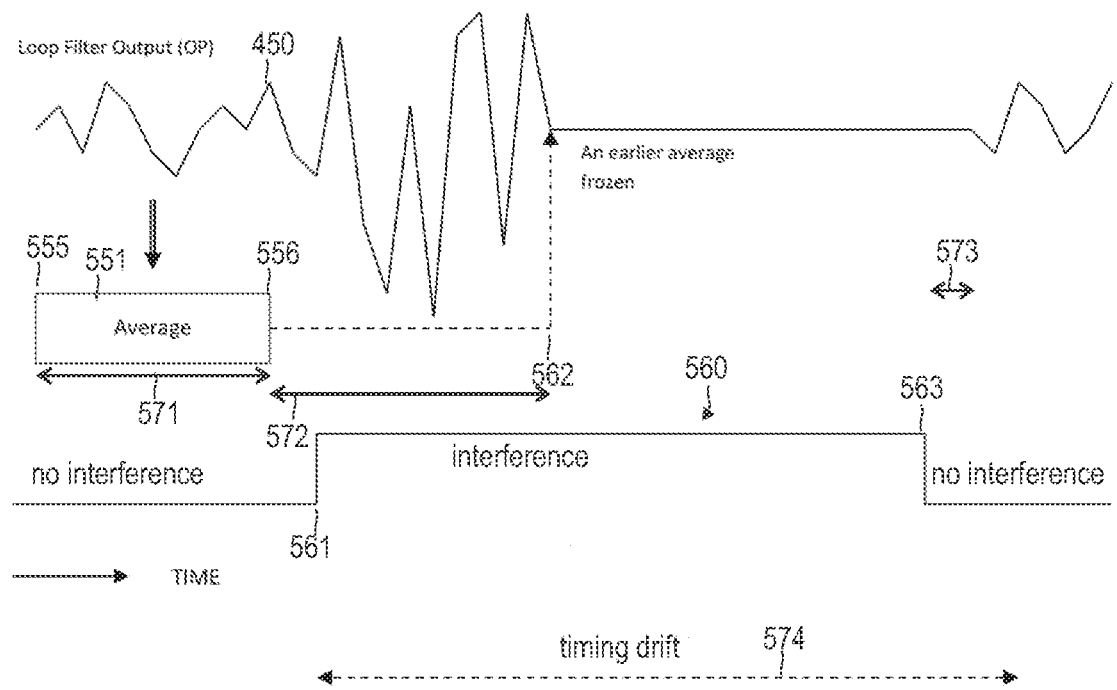
FIG. 5 schematically illustrates an interference event on the DS channel.

FIG. 5 illustrates aspects of the functioning of the circuit 407. FIG. 5 illustrates the output signal 450 over the course of time. FIG. 5 further illustrates presence of an interference event 560. The interference event 560 has a start point 561 and an endpoint 563. As can be seen from FIG. 5, the circuitry 120 only detects the interference event 560 at a point in time 562 which is well after the start point 561. This is due to the inherent latency in the detection of the interference event.

The circuit 407 implements combination of a plurality of cached values of the output signal 450. For this, a sliding window 551 is implemented by the circuit 407. The combination of cached values is implemented for cached values situated within the sliding window 551. In the example of FIG. 5, the combination is implemented by averaging. Other techniques of combining are possible such as median, etc.

An upper end 556 of the sliding window 571 is offset from a lower end of the sliding window 555 by a duration 571 (sliding window size). E.g., in some examples, the sliding window size 571 may amount to at least 1 millisecond, preferably at least 5 milliseconds, more preferably at least 10 milliseconds. E.g., in some examples, the sliding window size 571 may correspond to the duration of at least 1 transmission frame used for transmitting packetized data on the DS channel 151, preferably of at least 3 transmission frames, more preferably of at least 10 transmission frames.

Furthermore, in FIG. 5, the time duration 572 between the upper end 556 of the sliding window 551 and the point in time 562 of detecting the interference event 560 is illustrated. E.g., the time duration 572 may amount to at least 1 milliseconds, preferably at least 5 milliseconds, more preferably at least 10 milliseconds. E.g., in some examples, the duration 572 may correspond to the duration of at least 1 transmission frame used for transmitting packetized data on the DS channel 151, preferably of at least 3 transmission frames, more preferably of at least 10 transmission frames. Because the position of the sliding window 551 may progress over time, the duration 572 may be fixed.

By the technique as illustrated in FIG. 5, it is thus possible to determine the output signal 450 by going back to an earlier point in time—corresponding to the duration 572 between the point in time 562 of said detecting and the upper end 556 of the sliding window 551. This helps to address the latency in detecting the interference. As can be seen, the duration 572 is dimensioned to be a bit longer than the time offset between the lower end 561 of the interference event 560 and the point in time 562 of said detecting of the interference event 560.

The techniques in FIG. 5 further enable to determine the output signal 540 based on a combination of a plurality of cached values. In particular, averaging of the plurality of cached values is possible. This is motivated on the finding that even without the presence of an interference event, the output signal 450 fluctuates due to noise in the system. Thus, it is generally preferable to combine a plurality of cached values to avoid unwanted offsets by smoothing out the noise fluctuations.

A further time duration 573 is illustrated in FIG. 5. As is apparent from FIG. 5, even after recovery from the interference event 560, the output signal 450 is held frozen for the duration 573.

Figure 6:
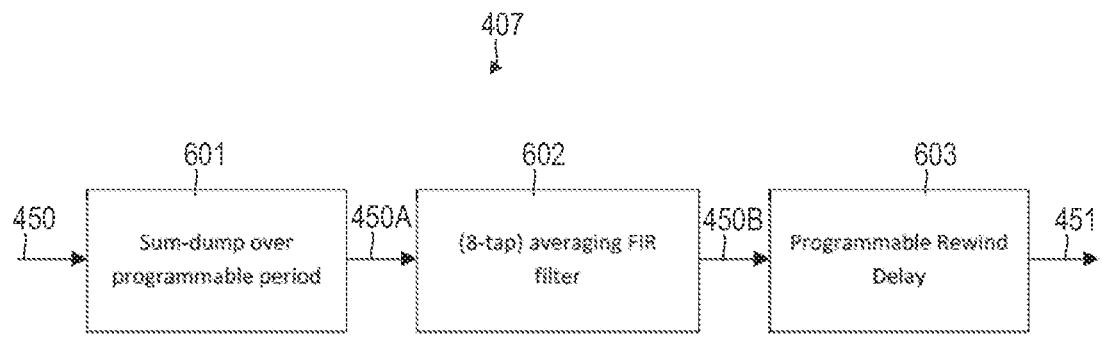
FIG. 6 schematically illustrates elements of the circuitry of the device of FIG. 1 for interference mitigation according to various embodiments.

FIG. 6 illustrates aspects with respect to the circuit 407. The circuit 407 implements the combination of the plurality of cached values by means of a sum dump 601 in combination with a running average filter 602. The filter 602 may be implemented as an averaging finite impulse response filter.

The sum dump 601 is configured to cache a plurality of previous values of the output signal 450. For this, the sum dump is configured to average the specified number of values of the output signal 450 and provide a single output signal 450A according to the average. The sum dump 601 may be configured to continuously implement such averaging. E.g., in one example, the sum dump period may be set to 16 OFDM symbol periods. Then, 16 values are averaged to produce a single output signal 450A per 16 input values. This corresponds to the sliding window 551. The sliding window 551 may progress in time domain step-wise, e.g., every 16 values according to the present example.

Accordingly, in this example, the filter 602 updates its output 450B every 16 values as well. Also a programmable rewind delay updates its output every 16 values. The programmable rewind delay 603 implements a shift register. E.g., the length of the shift register may be set to 4. Again, this corresponds to caching of values of the output signal 450. Then, the total delay corresponds to 64 values. Thus, the duration 572 corresponds to 64 times the symbol period.

If the loop filter 302, 303, 304 comprises other integrators, the same principle can be applied to each integrator.

As will be appreciated from the above, the circuit 407 allows implementing an average timing loop output 451 re-wound in time by a certain number of symbol periods if compared to the output signal 450. The circuit 407 continues to do that irrespective of whether its output signal 451 is used or discarded. If an interference event is detected, the control 408 of the switch 405 selects the output signal 451 of the circuit 407 to provide as the output signal 450. This may be done for a single symbol period according to some examples. Subsequently, the output signal 450 is held frozen by means of the branch 406. E.g., the output signal 450 may be held frozen by means of the branch 406 for a number of symbol periods after detecting recovery from the interference event 560.

The elements 601, 602, 603 are continuously operating, but there is a delay at the output of the circuit 407; this delay corresponds to the duration 572.

Figure 7:
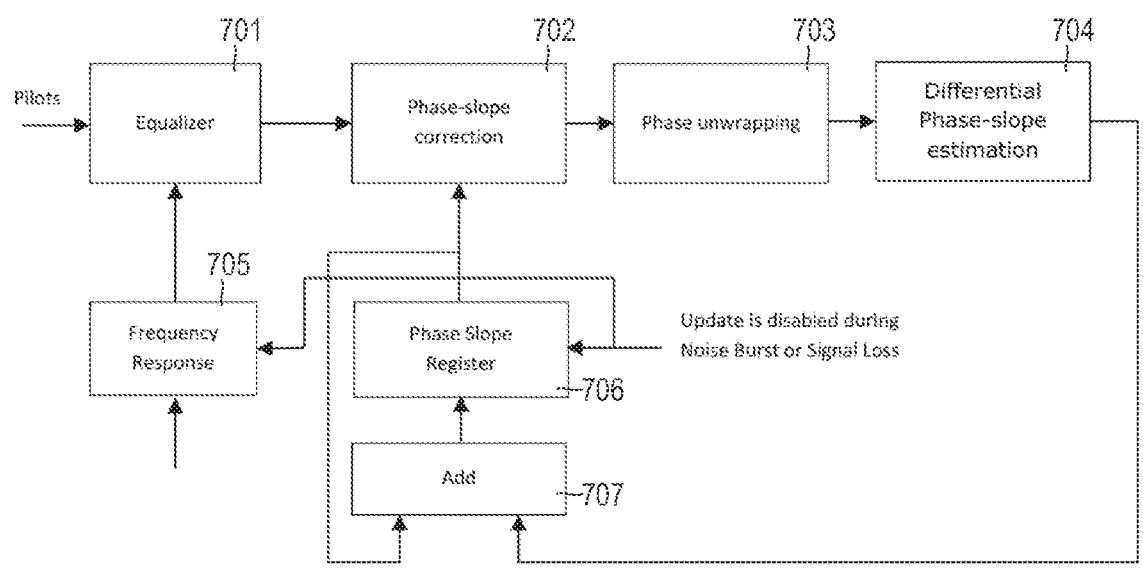
FIG. 7 schematically illustrates elements of the circuitry of the device of FIG. 1 for interference mitigation according to various embodiments.

FIG. 7 illustrates aspects with respect to determining a timing drift due an interference event 560. For this, the receiver implements a phase analysis function 263 (cf. FIG. 2). FIG. 7 illustrates details of the function 263.

An equalizer 701 receives downlink pilot signals. The downlink pilot signals have a well-defined transmission amplitude and phase. The downlink pilot signals may be allocated to some subcarriers of the transmission band and may correspond to OFDM symbols having a predefined modulation. The equalizer 701 performs equalization with reference to the channel frequency response. The channel frequency response is determined by circuit 705. The channel frequency response is estimated using scattered downlink pilot signals by circuit 705. Modulation is cancelled using the known pilot modulation.

It is then possible to determine the phase gradient for each OFDM symbol in the frequency domain: This is the phase slope correction applied by the circuit 702. The phase gradient may be determined with reference to a predetermined reference phase gradient obtained from register 706. The reference phase gradient may correspond to the phase gradient of a previous symbol: The circuit 702 may thus correct the phase gradient of a current symbol based on the phase gradient of the previous symbol, transmitted some time prior to the current symbol.

Because the reference phase gradient is used, the pilot subcarriers output by circuit 702 may exhibit some residual phase gradient; the residual phase gradient corresponds to the difference in the phase gradient between the current symbol and the previous symbol associated with the reference phase gradient. Sometimes, the residual phase gradient is labeled differential phase gradient or differential phase slope, because it refers to the difference in the phase gradient between the current and the preceding symbol.

Then, unwrapping of the differential phase gradient is implemented by the circuit 703. Because the unwrapping is based on the differential phase gradient, phase wrapping is limited and unwrapping is simpler. This is because the differential phase gradient is typically small and there will be only few phase-wraps, if any. Ambiguities are avoided.

A circuit 704 then determines the differential phase gradient of the phase-unwrapped pilot subcarriers over the frequency range, e.g., to give the differential phase gradient in units of radians per Hertz.

The thus determined unwrapped differential phase gradient is then combined by adder 707 with the phase gradient of the preceding symbol to obtain an updated phase gradient corresponding to the current symbol. The updated phase gradient is cached in the register 706. The updated phase gradient is provided as reference phase gradient to circuit 702. Thus, for the next symbol—which is typically the next neighbor symbol if no interference event is detected—, the circuit 702 corrects the phase gradient accumulated up to the current symbol, thereby enabling the circuit 704 to determine the additional phase gradient experienced by the new symbol.

If an interference event 560 is detected, the register 706 is not updated. Additionally, the circuit 705 does not provide updates. The register 706 is only updated once the interference event 560 has resolved. As a result, the differential phase gradient determined by circuit 704 is the difference between the phase gradient at the end of the interference event and the phase gradient at the beginning of the interference event: The previous symbol is located prior to a start point of the interference event and the current symbol is located subsequent to an end point of the interference event.

Said differential phase gradient is then added to the phase gradient stored in the register 706; this stored phase gradient corresponds to a point in time prior to the start point of the interference event. Thus, the stored phase gradient is not corrupted by the interference event. By adding the differential phase gradient to the stored phase gradient, an updated phase gradient is obtained.

The phase gradient thus obtained is used to equalize OFDM symbols subsequent to the end point of the interference event. This may increase an accuracy of said equalizing. This may further significantly speed up the downstream recovery time: In particular, the downstream decoder may recover within one OFDM symbol subsequent to the end point of the interference event.

As will be appreciated from the above, after recovery from the interference event 560, the timing drift during the interference event 560 is determined based on the phase gradient determined based on symbols received prior to the interference event—stored by the register 706—and the phase gradient determined based on symbols received subsequent to the interference event. This may be done according to the equation:

$$\Delta \tau = -\frac{1}{2\pi} \frac{d(\Delta \Phi)}{df} = -\frac{1}{2\pi} \left( \frac{d(\Phi \text{after})}{df} - \frac{d(\Phi \text{before})}{df} \right).$$

Here, $\Delta \tau$ denotes the timing drift, $d(\Delta \Phi)/df$ denotes the difference between the phase gradient prior to $$\left( \frac{d(\Phi \text{before})}{df} \right)$$

and the phase gradient after $$\left( \frac{d(\Phi \text{after})}{df} \right)$$

the interference event 560. These values may be obtained from the register 706.

Also, in the scenario FIG. 7 it can be desirable to provide safety margins before the start point 561 and after the endpoint 563 of the interference event 560. E.g., the safety margins can amount to a duration corresponding to a duration of at least one transmission frame of the DS channel 151, preferably about 3 transmission frames.

The timing drift can be used for various purposes. In one example, the timing drift enables to recover the receiver after the end of the interference event 560. Packet loss can be minimized. In a further example, US timing can be adjusted. E.g., it is possible to transmit on the US channel 152 using time-frequency resource element for US symbols which is determined based on the timing drift. In other words, the specific timing of the resource elements of the resource mapping can be accurately determined based on the knowledge of the timing drift.

While the features described above enable to implement a modem in a comparably robust manner irrespective of the particular physical medium used by the channel, they may have particular relevance in full duplex transmissions of Hybrid Fiber Coax. Typically, cable segments comprise multiple taps. At each step, there are several drop cables connecting to cable gateways. If one customer equipment is transmitting US symbols at a particular tap, then the other modem at the same tap will experience an interference event. This will prevent reception of DS symbols. The techniques described herein help to avoid loss of US timing. The techniques described herein further facilitate resuming reception of downing symbols immediately after the end of the interference event.

Figure 8:
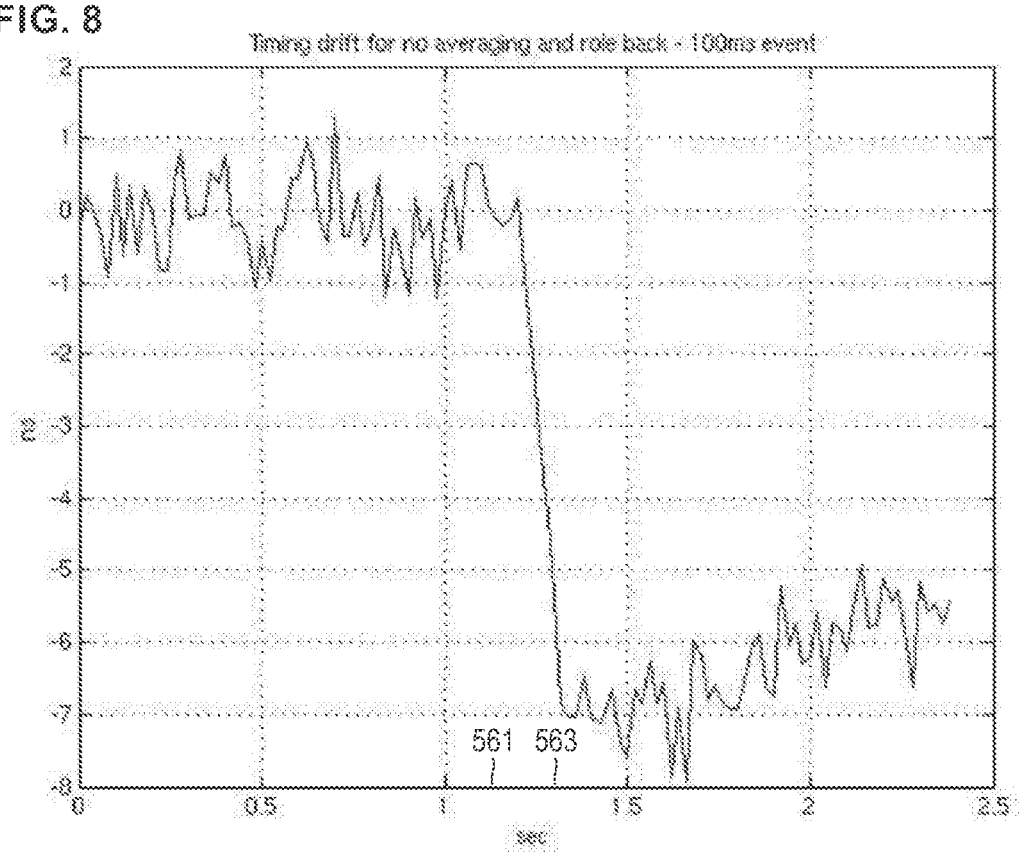
FIG. 8 illustrates a timing drift according to reference implementations.
Figure 9:
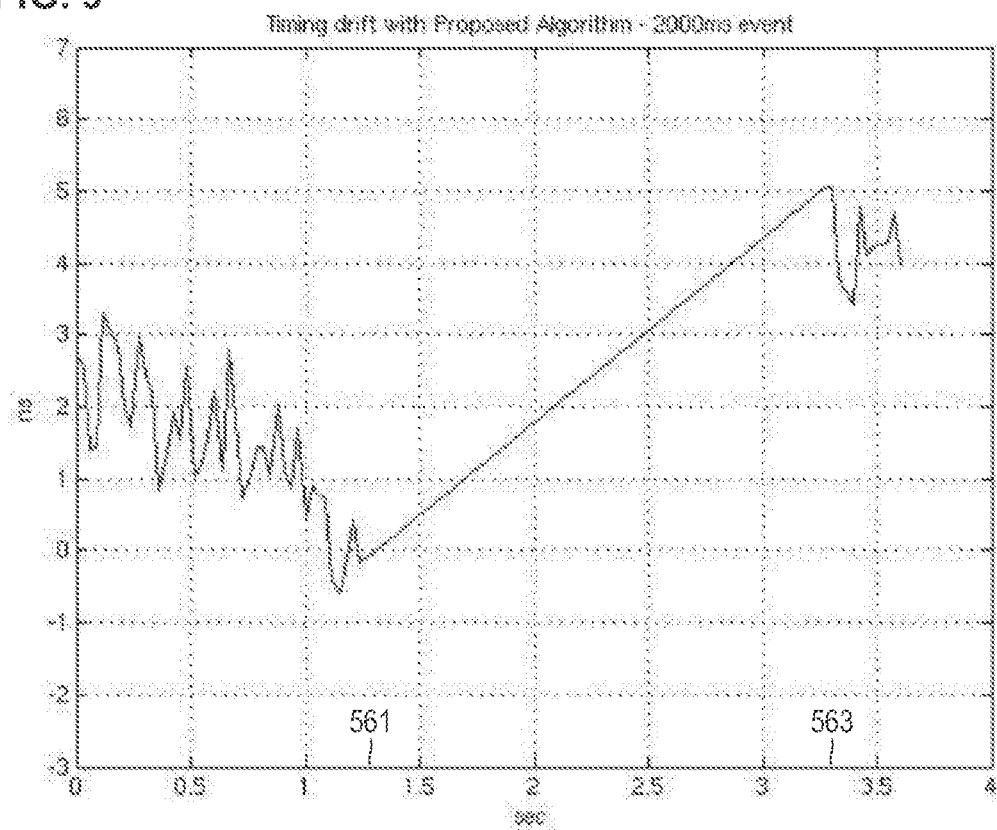
FIG. 9 illustrates a timing drift according to various embodiments.
Figure 10:
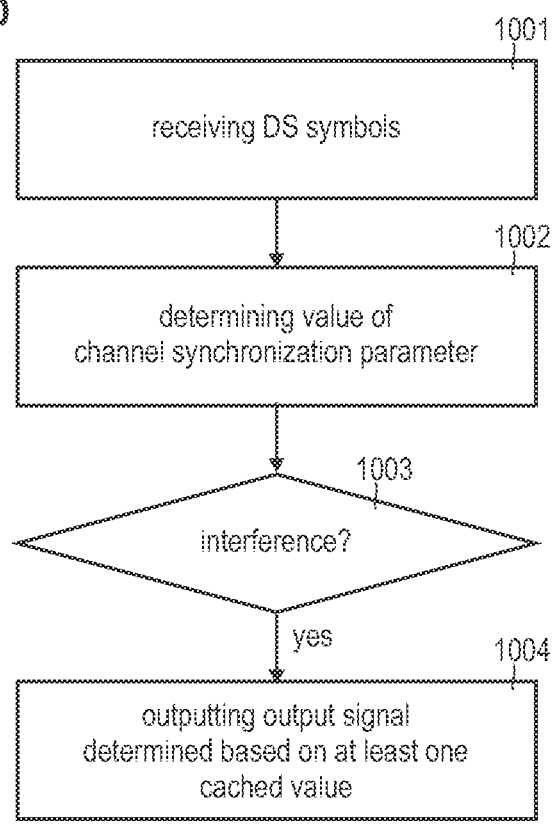
FIG. 10 is a flowchart of a method according to various embodiments.

FIGS. 8 and 9 illustrate the timing drift as a function of time. In particular, FIG. 8 illustrates the timing drift 900 according to reference implementations. An interference event 560 of 100 milliseconds duration takes place. As can be seen, according to reference implementations, the timing drift 900 after recovery from the interference event 560 amounts to about 8 nanoseconds. This effectively prevents transmission of US symbols.

Differently, in FIG. 9—which illustrates the timing drift 900 obtained by a device 100 configured according to the techniques described herein—the timing drift 900 only amounts to approximately 4 nanoseconds after an interference event of a duration of 2.0 seconds.

FIG. 9 is a flowchart of a method according to an example implementation. At 1001, DS symbols are received. Then, based on the received DS symbols, a value of the channel synchronization parameter—such as time-domain offset and frequency-domain offset—is determined, 1002.

At 1003, it is checked whether an interference event has been detected. If an interference event has been detected, at 1004, an output signal is output which has been determined based on at least one cached value of the channel synchronization parameter.

Figure 11:
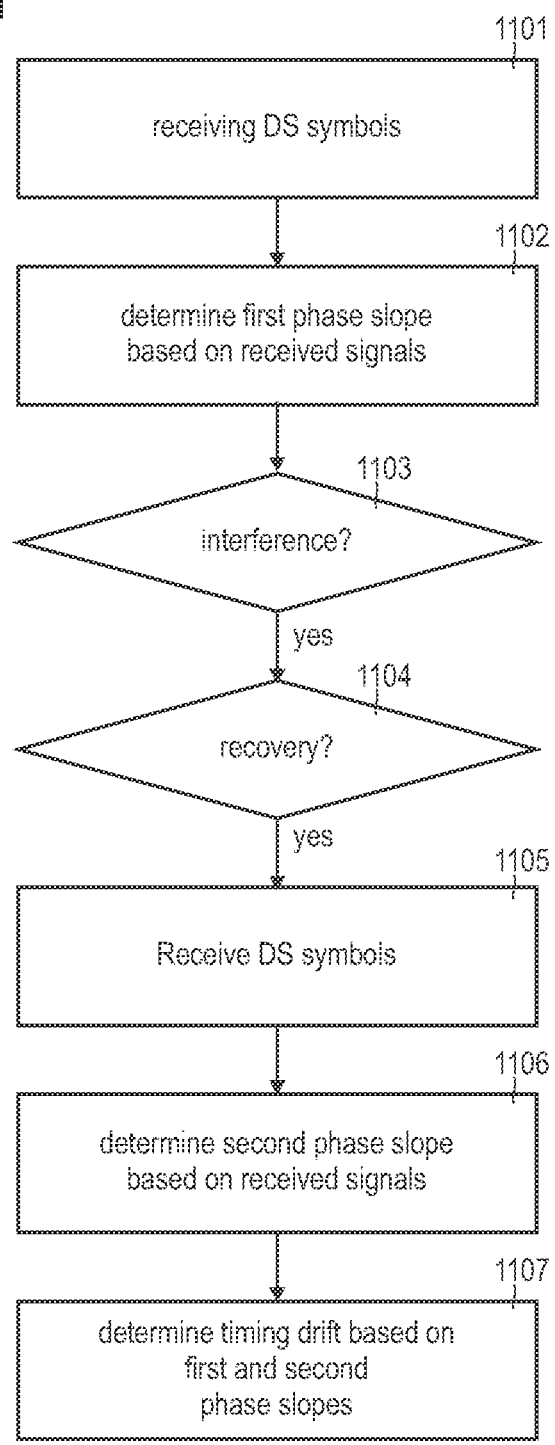
FIG. 11 is a flowchart of a method according to various embodiments.

FIG. 11 is a flowchart of a method according to examples implementations.

At 1101, one or more DS symbols are received. E.g., at 1102, one or more DS pilot signals corresponding to the DS symbols having a predefined modulation may be received. Then, at 1102, a first phase gradient is determined based on the received one or more DS symbols.

Next, at 1103, it is checked whether an interference event 560 occurs. If the interference event 560 is detected, at 1104 it is checked whether the interference event 560 has resolved.

Upon recovery from the interference event, at 1105, one or more DS symbols are received. Again, it is possible to receive one or more DS pilot signals.

Then, at 1106, a second phase gradient is determined based on the received DS symbols of block 1105.

At 1107, the timing drift during the interference event detected at 1103 is determined based on a combination of the first and second phase gradients determined at 1102 and 1106.

Summarizing, above techniques of interference mitigation have been disclosed. E.g., if an interference event is detected on the DS channel, various parameters may be stopped from being updated and held frozen until recovery from the interference event. Such parameters may include channel synchronization parameters that are continuously tracked by a clock and carrier recovery loop filter. Such parameters may alternatively or additionally include OFDM symbol timing and the channel frequency response.

According to various examples, a "time-shift" mechanism is proposed which enables to freeze the state of the clock and carrier recovery loop filter at a point in time prior to said detecting of the interference event. This enables to address inherent delay in the detection of the interference event during which duration the state of the filter may be corrupted due to increased noise.

According to further examples, a combination of a plurality of values of the timing and frequency offsets before said detecting of the interference is performed. E.g., averaging is possible. The corresponding result is held frozen. This helps to address the finding that the clock frequency offset covered by the clock recovery loop filter may be noisy even before the start point of the interference event. By a combination of a plurality of cached values prior to the start point of the interference event, noise may significantly be reduced.

According is still further examples, any residual error— e.g., persistent after taking measures as described above— can result in a timing drift. The timing drift occurs during a frozen state of the circuitry. According to examples, it is possible to determine this timing drift in response to recovery from the interference event. The timing drift can be determined using the unwrapped phase gradients prior to and after the interference event. Thereby, US data can be communicated according to the time-frequency resource mapping with accurate synchronization. Also, DS symbols can be received and decoded according to accurate synchronization.

All such measures contribute to increased capabilities of interference mitigation even in view of interference events of considerable length. Reregistration or re-execution or training phases can be avoided. It is possible to recover quickly from the interference event.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

The invention claimed is:

1. A device, comprising:
a receiver configured to receive symbols on a downstream channel,
at least one circuitry configured to determine a value of a channel synchronization parameter based on the received symbols,
wherein the at least one circuitry is further configured to detect an interference event on the downstream channel,
wherein the at least one circuitry is further configured to output an output signal determined based on at least one cached value of the channel synchronization parameter in response to detecting the interference event, the at least one cached value being determined based on symbols received prior to and offset from said detecting of the interference event.

2. The device of claim 1,
wherein the at least one circuitry is further configured to determine the output signal based on a combination of a plurality of cached values.

3. The device of claim 1,
wherein the channel synchronization parameter is at least one of a time-domain offset and a frequency-domain offset between the receiver and a transmitter of a further device transmitting the symbols.

4. The device of claim 2,
wherein the at least one circuitry comprises an averaging finite impulse response filter to determine the output signal based on the combination of the plurality of cached values.

5. The device of claim 2,
wherein the at least one circuitry comprises a sum dump to determine the output signal based on the combination of the plurality of cached values.

6. The device of claim 2,
wherein the at least one circuitry is configured to select the plurality of cached values based on a time-domain sliding window having an upper end prior to and offset from said detecting of the interference event.

7. The device of claim 2,
wherein the at least one circuitry comprises:
a switch having an input terminal and an output terminal, the output terminal being configured to output the output signal,
a first branch configured to determine a first signal based on block averaging of a plurality of cached values,
a second branch configured to determine a second signal based on the preceding output signal,
a control configured to operate the switch in response to detecting the interference event to initially provide the first signal as the output signal and subsequently provide the second signal as the output signal.

8. The device of claim 2,
wherein the at least one circuitry is configured to attempt decoding of the symbols based on the output signal and in response to detecting the interference event,
wherein the at least one circuitry is configured to detect recovery from the interference event based on said attempted decoding.

9. The device of claim 6,
wherein the upper end of the sliding window is offset from a lower end of the sliding window by a duration corresponding to a duration of at least one transmission frame of the downstream channel, preferably of at least three transmission frames, more preferably of at least ten transmission frames; and/or
wherein the upper end of the sliding window is offset from said detecting of the interference event by a duration corresponding to a duration of at least one transmission frame of the downstream channel, preferably of at least three transmission frames, more preferably of at least ten transmission frames.

10. A method, comprising:
receiving symbols on a downstream channel,
determining a value of a channel synchronization parameter based on the received symbols,
detecting an interference event on the downstream channel,
in response to detecting the interference event: outputting an output signal determined based on at least one cached value of the channel synchronization parameter, the at least one cached value being determined based on symbols received prior to and offset from said detecting of the interference event.

11. The method of claim 10, further comprising:

determining the output signal based on a combination of a plurality of cached values.

12. The method of claim 11, wherein the output signal is determined based on the plurality of cached values using at least one of an averaging finite impulse response filter and a sum dump.

* * * * *